(12) United States Patent
Goldberg

(10) Patent No.: US 8,145,139 B2
(45) Date of Patent: Mar. 27, 2012

(54) SIMPLIFIED RADIO FREQUENCY RECEIVER

(75) Inventor: Bar-Giora Goldberg, San Diego, CA (US)

(73) Assignee: AVAAK, Inc., San Diego, CA (US)

( * ) Notice: Subject to any disclaimer, the term of this patent is extended or adjusted under 35 U.S.C. 154(b) by 947 days.

(21) Appl. No.: 11/577,988

(22) PCT Filed: Oct. 25, 2005

(86) PCT No.: PCT/US2005/038443
§ 371 (c)(1),
(2), (4) Date: Apr. 25, 2007

(87) PCT Pub. No.: WO2006/047540
PCT Pub. Date: May 4, 2006

(65) Prior Publication Data
US 2009/0130988 A1    May 21, 2009

Related U.S. Application Data

(60) Provisional application No. 60/621,619, filed on Oct. 25, 2004.

(51) Int. Cl.
*H04B 1/38*    (2006.01)

(52) U.S. Cl. ........ 455/73; 455/313; 455/450; 455/452.1; 455/333; 331/16

(58) Field of Classification Search .......... 455/73, 455/313, 450, 452.1, 333; 331/16, 107
See application file for complete search history.

(56) References Cited

U.S. PATENT DOCUMENTS

| | | | |
|---|---|---|---|
| 5,930,696 A * | 7/1999 | Tzuang et al. | 455/311 |
| 2004/0198363 A1* | 10/2004 | Zinn | 455/450 |
| 2004/0227578 A1* | 11/2004 | Hamalainen | 331/107 A |
| 2004/0263262 A1* | 12/2004 | Ravi et al. | 331/46 |
| 2005/0030108 A1* | 2/2005 | Duncan et al. | 331/16 |
| 2005/0090222 A1* | 4/2005 | Knecht et al. | 455/333 |

* cited by examiner

*Primary Examiner* — Sanh Phu
(74) *Attorney, Agent, or Firm* — Manuel F. de la Cerra

(57) ABSTRACT

An oscillator is provided that is arranged to function as a simplified receiver. The oscillator has a resonator portion and a non-linear portion, which cooperate to generate an oscillating signal. The resonator portion is positioned to receive a modulated signal. In one configuration, the oscillator operates at a frequency offset from the frequency of the carrier for the modulated signal. In this simple arrangement, the oscillator functions as an active mixer, and generates a product output signal. The output signal is extracted from a high impedance point of the oscillator's non-linear device. The output signal is a demodulated or mixed signal, and may be further processed to detect a data signal.

19 Claims, 10 Drawing Sheets

SIMPLIFIED RADIO FREQUENCY RECEIVER

RELATED APPLICATIONS

This application claims priority to U.S. provisional patent application No. 60/621,619, filed Oct. 25, 2004, and entitled "Simplified Transceiver Architecture for Short Range Radio Telemetry", which is incorporated herein in its entirety.

FIELD OF THE INVENTION

The field of the present invention is wireless receiver devices. More particularly, a wireless transceiver is disclosed for use in a wireless radio system.

BACKGROUND

The use of short-range miniature radios for communications has increased significantly in the last several years. With the widespread adoption of the Bluetooth standard, the introduction of network protocols like IEEE 802.11x, and the development of single chip radios, the potential for rapid market growth exists in applications ranging from wireless keyboards, Short Range Devices (SRD), and radio sensors for in-vivo medical diagnosis and monitoring.

In the case of in-vivo medical devices, which require 2-way communications, such as hearing aids and implantable sensors, the overall size and power dissipation of the device are of outmost concern. In addition to their communications and sensing circuits, these devices require a discrete and exhaustible power source (typically a battery) to operate. Thus, the operational life of the device is completely dependent on the life of the battery. In some cases, replacement of a discharged battery may even require invasive surgery.

Wireless communications equipment, such as cellular and other wireless telephones, wireless networks (WiLAN) components, mobile radios and other wireless devices are enjoying increasing popularity in the contemporary consumer market. One reason for their increase in popularity is the large number of applications that such devices are now capable of supporting and the wide availability of wireless services. Wireless devices also continue to expand their use in commercial, medical and military applications for example in in-vivo medical applications for similar reasons. As the acceptance and use of wireless devices grows, consumers and commercial users are demanding power efficient communications.

While many radio chips use stand alone transmitters or receivers functionality, most applications require two-way radios. The usual way of adding a receiver to a transmitter is by adding a transmit/receive switch to connect the antenna to either the transmit or receive chain and adding a receiver block. The receiver block typically includes a Low Noise Amplifier (LNA), mixer, IF amplification, and either IF processing for data demodulation or another conversion to baseband. The circuits are quite complicated and require at least doubling of the radio size. Further, these receiver components consume power, thus contributing to shortened battery life.

For purpose of background, it will be appreciated that oscillators are amplifiers with a feedback mechanism. When certain conditions are met (Barkhausen conditions: sufficient open loop gain when the phase is 0 degrees), the device will oscillate. Stated mathematically, if $G(s)$ is the forward gain of the oscillator and $H(s)$ its resonator (feedback device), then the close loop of this system is given (like for all linear feedback systems) by: $Z(s)=G(s)/1+G(s)H(s)$. In practice, the oscillator oscillates at the frequency in which the denominator is 0, or generally, $G(s)H(s)=-1$.

A significant amount of literature exists in the public domain which describes oscillator theory and non-linear simulation tools used to predict phase noise and other parameters. Generally, as is well known, oscillators generate a narrow band noise signal, and must operate in the non-linear zone of the active device because the open loop gain must typically be at least 6 dB to begin oscillation. When the apparatus settles, it has an average gain of 0 dB ($|G(s)H(s)|=1$) and hence, inherent non-linearity. In all oscillators, the signal spends a limited time in the linear region before it enters non-linearity of the active device to produce an overall gain of 1. As will be appreciated, oscillators have a high close-loop gain close to the oscillating frequency (denominator goes to zero). This feature, combined with their inherent non-linearity, might result in injection locking, which is regularly observed in the laboratory.

SUMMARY OF THE INVENTION

Briefly, the present invention provides an oscillator arranged to function as a simplified receiver. The oscillator has a resonator portion and a non-linear portion, which cooperate to generate an oscillating signal. The resonator portion is positioned to receive a modulated signal. In one configuration, the oscillator operates at a frequency offset from the frequency of the carrier for the modulated signal. In this simple arrangement, the oscillator functions as an active mixer, and generates a product output signal. The output signal is extracted from a high impedance point of the oscillator's non-linear device. The output signal is a demodulated or mixed signal, and may be further processed to detect a data signal.

In a more specific example, the oscillator is a voltage controlled oscillator (VCO), and is frequency stabilized with a phase lock loop (PLL) circuit. The VCO has a resonator portion and a non-linear portion, which cooperate to generate a stable oscillating signal. The PLL circuit has a control line which couples to the non-linear portion of the VCO. The resonator portion is positioned to receive a modulated signal. In one configuration, the VCO operates at a frequency offset from the frequency of the carrier for the modulated signal. In this simple arrangement, the VCO functions as an active mixer, and generates a product output signal. The output signal is extracted from a high impedance point of the oscillator's non-linear device. In particular, the output signal may be extracted from the PLL control line. The output signal is a demodulated or mixed signal, and may be further processed to detect a data signal.

Advantageously, the simplified receiver enables an simple oscillator to operate as a receiver. This simplified construction allows a receiver to be more efficiently constructed, and enables a substantial reduction in components needed to implement a radio module. This not only enables smaller radio modules to be built, but allows a radio module to operate with less power. Since size and power usage are critical to many applications and wireless devices, the simplified receiver may have a significant impact on future radio designs. Indeed, the simplified receiver may enable new devices and new applications where traditional receivers were not commercially or technically practical. In this way, the simplified receiver may enable the proliferation of low cost devices that are enabled to receive wireless communications.

DETAILED DESCRIPTION OF THE PREFERRED EMBODIMENT

Figure 1:
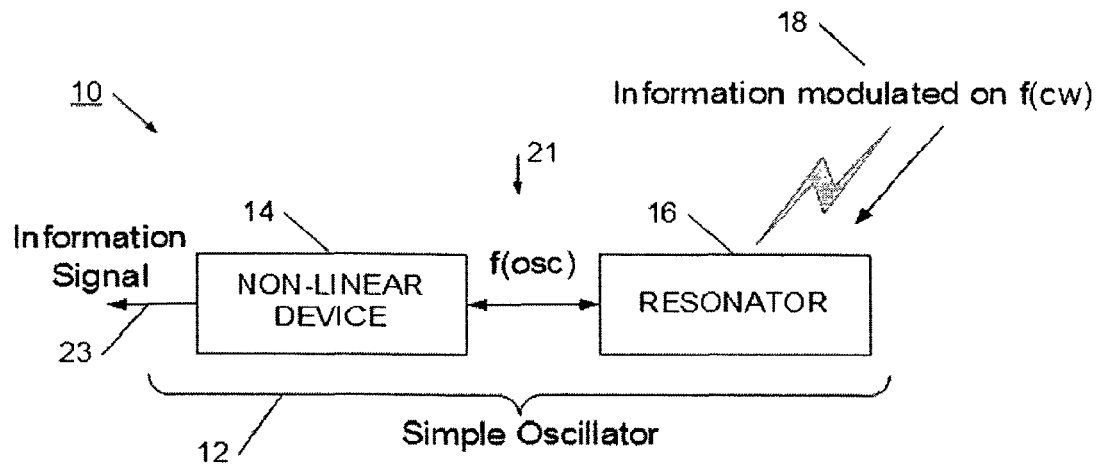
FIG. 1 is a block diagram of a simplified receiver in accordance with the present invention.

Referring now to FIG. 1, simplified receiver 10 is illustrated. Simplified receiver 10 is constructed to receive a modulated signal 18 and generate information signal 23. Modulated signal 18 typically has a carrier signal operating at f(cw), and has an information component modulated onto the carrier. The modulation method may be, for example, a frequency modulation, an amplitude modulation, a phase modulation, or other modulation process. Modulated signal 18 may be generated by a wireless transmitter attempting to send information to receiver 10. In its most basic form, receiver 10 is a simple oscillator 12 from which an information signal 23 may be directly extracted. As will be more fully described below, the simple and well known oscillator circuit may be arranged to operate as an active receiver device. Simple oscillator 12 may be a separate dedicated receiver device, or may be an oscillator which may selectively operate at one time as a receiver, and at another time, operate as a component in a transmitter chain. In this way, receiver 10 becomes a highly efficient structure for providing a receiver function using a simple oscillator. Stated more generally, a simple oscillator may be easily configured to receive a modulated signal, and directly generate a demodulate signal. This enables simplified receiver and radio structures not otherwise possible.

Simple oscillator 12 has a non-linear gain component 14 which cooperates with a resonator element 16 for providing oscillation at a particular frequency. By adjusting capacitance or inductance values for the oscillator, a particular frequency f(osc) 21 may be generated. In use, the oscillator 12 may be operated at a frequency at or near the carrier frequency for information signal 18. Accordingly, simple oscillator 12 may be constructed to operate at a frequency f(osc) 21, which is at or near f(cw) 21. Typically, however, it is more likely that the frequency of the oscillator f(osc) may be offset from the frequency of the carrier signal f(cw).

The oscillator 12 is positioned so that the modulated signal 18 is received at resonator 16. Resonator 16, may be, for example an induction element, a coil, a strip line, an antenna printed on PC, or other resonating element. To increase sensitivity, the oscillator 12 may be positioned to reduce RF shielding around resonator 16. For example, the oscillator 12 may be placed in an area away from heavy shielding or high-density electronic components. The modulated signal 18 typically has a carrier operating in the radio frequency (RF) frequency band, and has been modulated with a signal at a much lower frequency. The resonator 16 and nonlinear device 14 cooperate to mix modulated signal 18 with the oscillator signal, to generate a mixed product signal. If the oscillator is operating at a frequency at or near the carrier wave of the modulated signal 18, the information signal 23 will be a demodulated signal. In most cases, however, information signal 23 will be a mixed signal operating at an intermediate frequency. In this regard, additional processing steps may be needed to detect the information signal from the intermediate frequency signal. As will be appreciated, simple oscillator 12 directly provides a receiver mixing function.

Advantageously, simplified receiver 10 enables a simple oscillator 12 to operate as a receiver. This simplified construction allows a receiver to be more efficiently constructed, and enables a substantial reduction in components needed to implement a radio module. This not only enables smaller radio modules to be built, but allows a radio module to operate with less power. Since size and power usage are critical to many applications and wireless devices, the simplified receiver may have a significant impact on future radio designs. Indeed, the simplified receiver may enable new devices and new applications where traditional receivers were not commercially or technically practical. In this way, the simplified receiver may enable the proliferation of low cost devices that are enabled to receive wireless communications.

Figure 2:
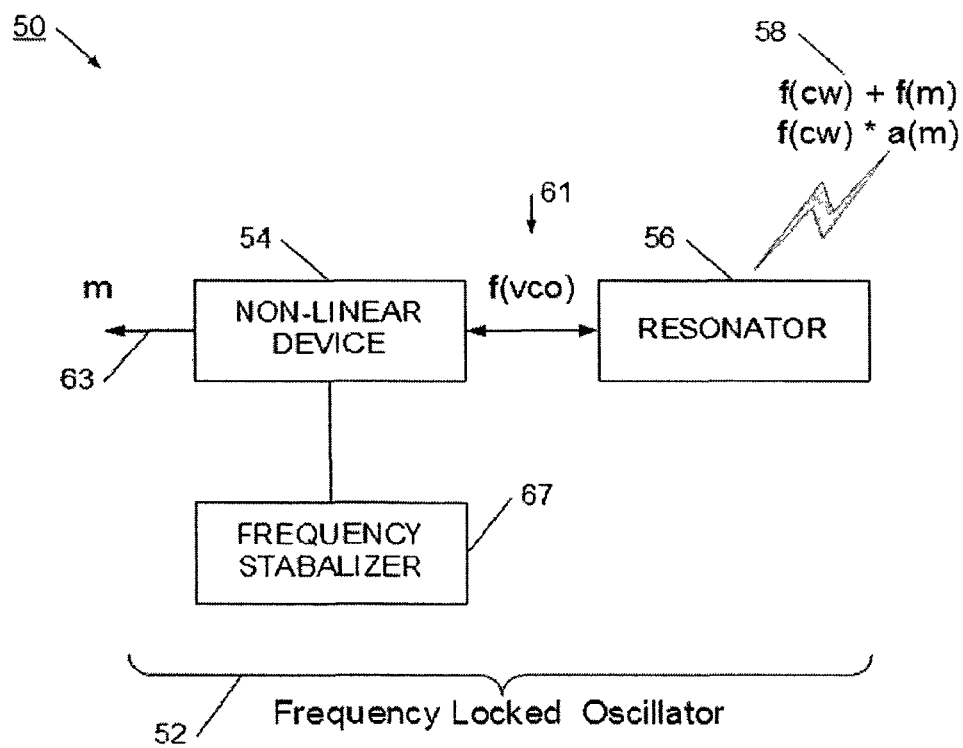
FIG. 2 is a block diagram of a simplified receiver in accordance with the present invention.

Referring now to FIG. 2, another simplified receiver 50 is illustrated. Simplified receiver 50 is similar to receiver 10 described earlier, so will not be described in detail. Simplified receiver 50 has a voltage controlled oscillator that has a nonlinear portion 54 and a resonator portion 56. The voltage controlled oscillator cooperates with a frequency stabilizer circuit 67 for stabilizing the frequency output 61 for the voltage controlled oscillator. In one example, the frequency stabilizer 67 is a phase lock loop circuit. The frequency locked oscillator 52 is positioned so that resonator 56 may receive a modulated RF signal 56. The modulated RF signal 56 may be frequency modulated, amplitude modulated, phase modulated, or otherwise modulated with an information signal. The modulated signal 58 has a carrier signal operating at f(cw). The frequency locked oscillator 52 is constructed to stabilize the oscillator at a frequency f(vco), which is typically offset from f(cw), although in some cases f(vco) may be set at or near the frequency of the carrier signal f(cw). The frequency stabilizer 67 is useful to counter the potential effects of injection locking. Injection locking is a known oscillator response in the presence of a strong carrier signal. Under the effects of injection locking, an oscillator tends to have its frequency pulled toward the frequency of the injected signal. This undesirable effect may be eliminated or reduced by providing frequency stabilizer 67. In this way, the frequency relationship between the oscillator and the carrier signal remains constant or nearly constant, and the oscillator does not react to injection locking effects. In use, the RF modulated signal 58 is received at resonator 56, which cooperates with nonlinear device 54 to mix or demodulate the modulated signal. The mixed signal 63 may be extracted from the nonlinear device, and additional amplification, filtering, or processing applied to the mixed signal to assist in data detection and use.

In one example, the simplified receiver uses a specialized phase-locked transmitter (which uses a VCO resonator as its antenna) as a receiver (i.e. creating a transceiver device) which enables a substantial reduction in the number of components needed for a radio transceiver. The output of this specialized receiver produces a demodulated baseband signal that is ready for further processing and data detection.

The VCO transmitter uses its inherent non-linear characteristics to generate (detect) an error signal between the received RF signal and the VCO-generated RF signal. The RF signal components are subsequently processed or mixed to demodulate data that has been modulated on the received signal. The RF modulates signal that is originated from outside sources may be transmitted at an offset frequency from the VCO frequency, and can carry both ASK (amplitude shift key) and FSK (frequency shift key) modulated information.

The simplified wireless receiver enables a structure and a process that can transform a radio transmitter into a radio receiver, without adding additional electronic components to the radio. This approach reduces the overall size of the device, saves power, and lowers the cost of the devices. This architecture may be most beneficially used in applications that require short radio ranges and low power transmissions such as: short range appliance and computer device control, RFID, medical and in-vivo monitoring or diagnostics.

The simplified receiver may operate according to the following general protocol:
  a. While in receive mode, the VCO will be tuned to CW mode;
  b. The received modulated signal may be transmitted at a small offset (e.g., 10-100 KHz) from the carrier, with AM or FM (or ASK, FSK) modulation, and will be demodulated in the VCO and the demodulate signal extracted at the PLL control line output
  c. Thereafter, the demodulated baseband signal shall be amplified (in baseband) and further processed for data extraction The non-linearity of the VCO produces the mixing of the products between the VCO signal and the received signal. This is produced by presenting a received RF signal to the VCO antenna (its coil) at small offset from frequency of oscillation. This signal thus has a frequency offset from the PLL as the VCO is locked to a crystal, and these 2 signals' product can therefore be extracted from the VCO control line.

Figure 3:
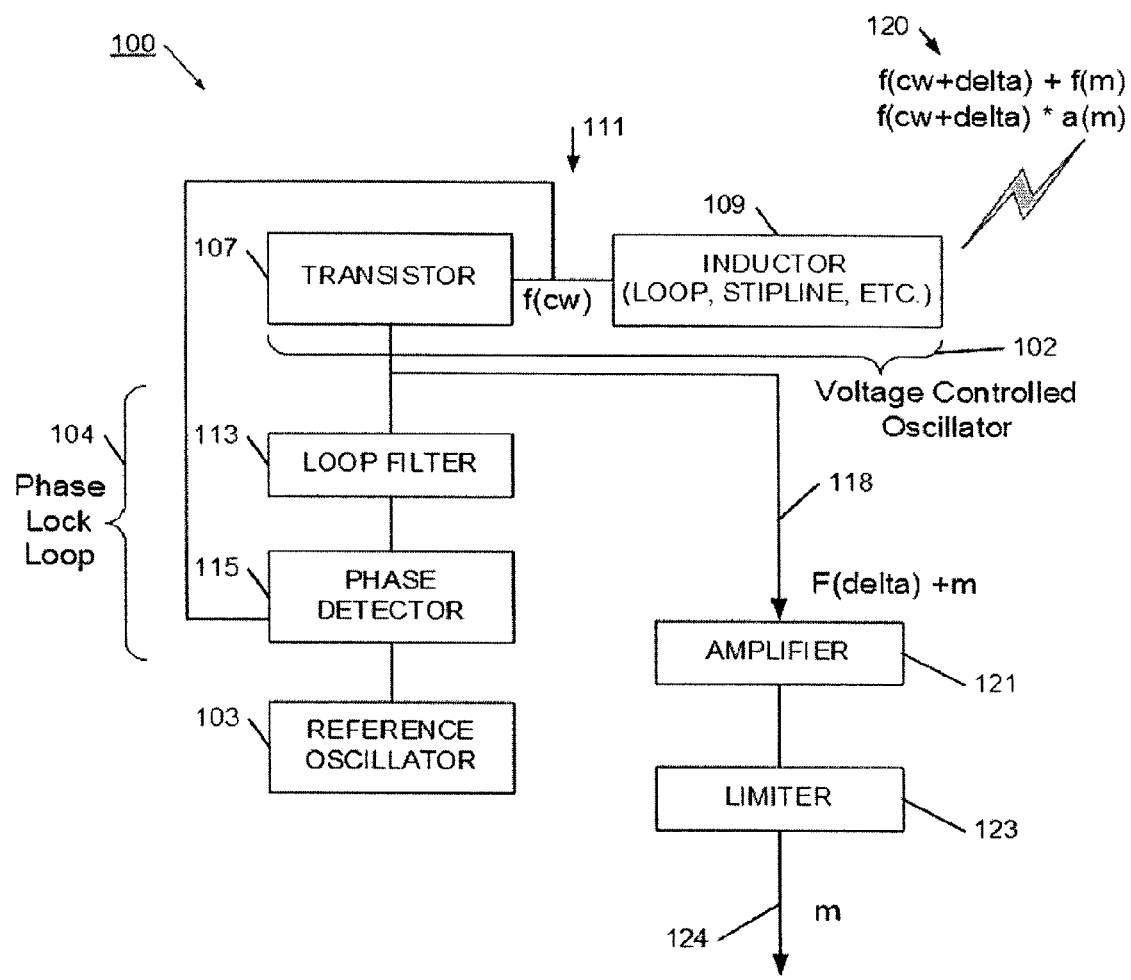
FIG. 3 is a block diagram of a simplified receiver in accordance with the present invention.

Referring now to FIG. 3, a simplified receiver 100 is illustrated. Simplified receiver 100 has a voltage controlled oscillator 102 having a transistor 107 which functions as a nonlinear device and an inductor 109, which may be an inductor loop, a strip line, microstrip, or other induction element. The transistor 107 and inductor 109 cooperate to oscillate at a frequency f(cw) 111. It will be appreciated that variable inductance or variable capacitance may be provided to allow adjustment of the fundamental oscillation frequency. The voltage controlled oscillator 102 has a phase lock loop 104 for providing frequency stabilization. As is well known, the phase lock loop 104 has a reference oscillator 103 providing a highly accurate and stable frequency source. The reference oscillator signal is received into a phase detector 115 where it is compared with the frequency being generated by the voltage controlled oscillator 102. Since oscillator frequency signal 111 may be much faster then the frequency of reference oscillator 103, it will be appreciated that dividers, filters, and other components may be used to adjust the signal before it is received at phase detector 115. Phase detector 115 then compares the phase between the reference oscillator signal and the oscillator signal, and a loop filtered 113 generates a signal according to any difference in detected phase. Loop filter 113 has a loop filter control line which connects to transistor 107, and applies an adjustment signal for adjusting a capacitance value at transistor 107. In this way, the frequency of the voltage controlled oscillator 102 may be adjusted according to any detected phase difference. Once the voltage controlled oscillator and the phase lock loop settle, the voltage controlled oscillator maintains a highly stable and reliable frequency output.

In operation, the voltage controlled oscillator is positioned so that inductor 109 is able to receive a modulated RF signal 120. The modulated RF signal 120 may have been generated by a cooperating transmitter attempting to send an information signal to receiver 100. Typically, the frequency of the transmitted carrier is known, so the frequency f(cw) of the voltage controlled oscillator may be selected to be at an offset from the expected frequency of the carrier signal. Typically, the offset may be selected in the range of about 10 kHz to about 100 kHz, although it will be appreciated that other offsets may be used depending on application specific requirements. Modulated signal 120 may be frequency modulated, phase modulated, amplitude modulated, or modulated with another n modulation process. Modulated signal 120 may have a carrier signal operating at or near the frequency of the voltage controlled oscillator 102, or, more typically, may be provided with a carrier operating at the VCO frequency plus a delta frequency. The size of this delta frequency may be adjusted according to application specific needs. By providing for a delta frequency, effects caused by small fluctuations in frequency variations may be eliminated.

As the inductor 109 receives the modulated signal 120, the inductor 109 and transistor 107 cooperate to generate a mixed or demodulated signal. The particular type of information signal generated will be dependent on the type of modulation used, and the magnitude of any frequency delta between the modulation carrier and the oscillator. In one example, if the delta frequency is sufficiently large, the information signal will be provided generally as an intermediate frequency signal (as an IF in a known receiver). However, if the carrier frequency and the oscillator frequency are nearly identical, then a generally demodulated signal may be generated directly. In this way, the VCO 102 acts similarly to a low or zero IF receiver.

The information signal 118 is extracted from the transistor 107 at a high impedance signal port. A high impedance signal port is selected so that operation of the voltage controlled oscillator 102 is not adversely affected. Further, extraction at a high impedance point minimizes power usage and assists in maintaining a good signal to noise ratio. It has been found that the loop filter control line may connect to the transistor 107 at a high impedance point, and the information signal may be extracted from the loop filter control line. It will be appreciate that other constructions may have alternate high impedance measurement ports. The information signal 118 will be a mixed-signal indicative of the frequency delta and the information signal. The signal is likely to be quite small (depending on strength of received signal), so may be amplified by a low noise amplifier 121. However, the VCO receiver functions as an active mixing device, and therefore provides an information signal 118 that has already been somewhat amplified. Accordingly, by selecting a higher-gain VCO device, more amplification may occur in the active mixing process, so less amplification of information signal 118 may be required by amplifier 121. The signal may be further filtered or processed to detect or use the demodulate data signal.

In one example, a limiting filter 123 is used to filter the frequency delta from signal 118. In this way, a simple low pass filter would be able to substantially remove the frequency delta from the signal, resulting in a relatively clean data signal 124. It will be appreciated that well-know baseband processes may be applied to information signal 118.

Figure 4:
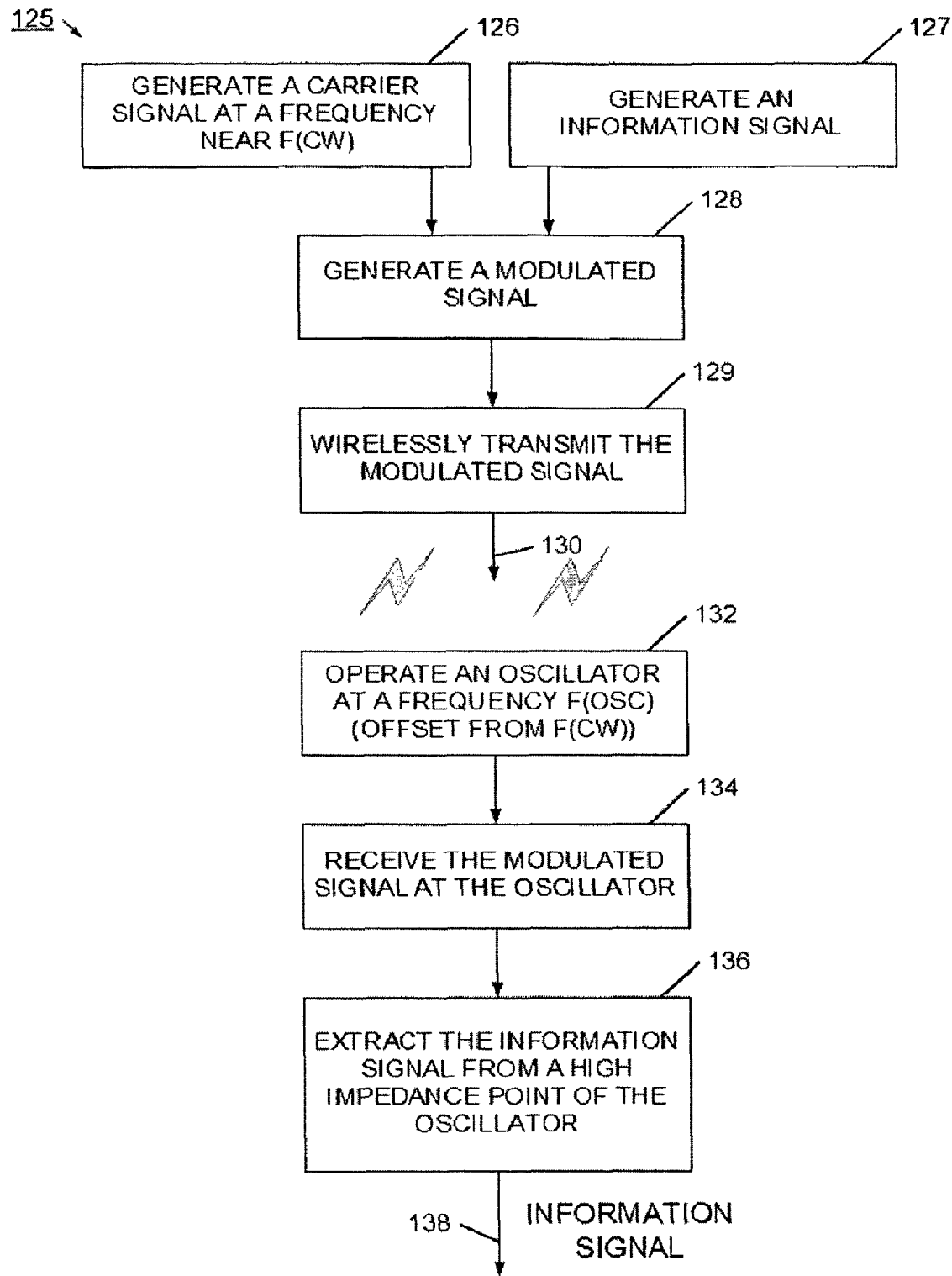
FIG. 4 is a flowchart of a method for using a simplified receiver in accordance with the present invention.

Referring now to FIG. 4, a process of using a simplified receiver is illustrated. Method 125 has a transmitter that generates a carrier signal at or near a frequency of F(CW). The transmitter also has an information or data signal 127 which is combined with the carrier to generate a modulated signal 128. The modulated signal may have been modulated using a frequency modulation, an amplitude modulation, a frequency modulation, or another modulation process. The transmitter wirelessly translates the modulated signal as shown in block 129. The modulated signal 130 radiates through space and is received at the simplified receiver. The simplified receiver has an oscillator that is operating at a frequency F(OSC), which is typically offset from the carrier frequency F(CW) as shown in block 132. Alternatively, the oscillator frequency F(OSC) may be set at or near to the carrier frequency F(CW). The modulated signal 130 is received at a resonator element for the oscillator as shown in block 134. The resonator and nonlinear element of the oscillator cooperate to generate a mixed or demodulated signal, which then may be extracted from a high impedance port of the oscillator as shown in block 136. In this way, an information or data signal 138 may be directly extracted from an oscillator. In one example, the oscillator, which is arranged to function as a receiver, may at other times function as an oscillator in a transmit chain.

Figure 5:
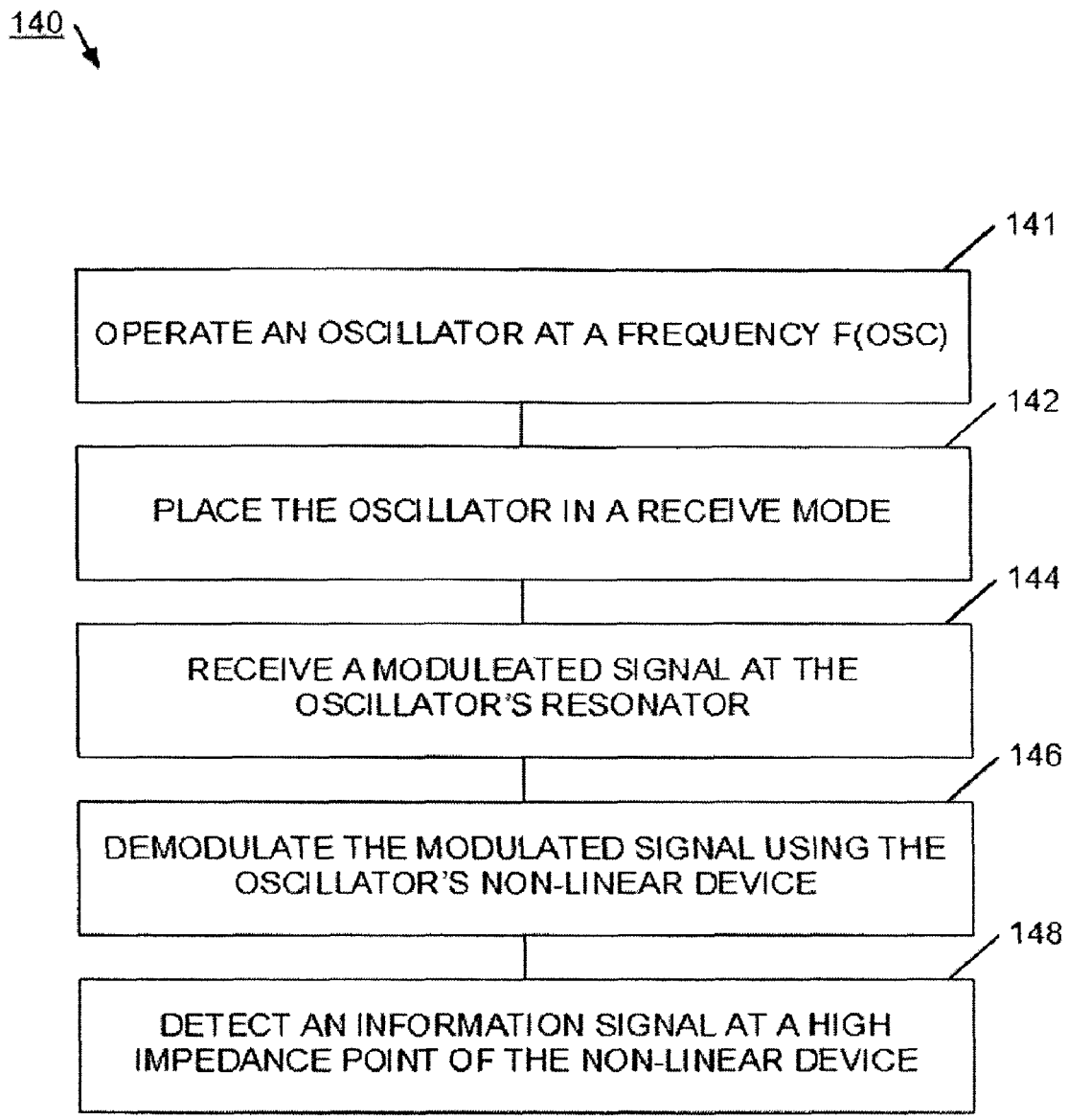
FIG. 5 is a flowchart of a method for using a simplified receiver in accordance with the present invention.

Referring now to FIG. 5, a process of operating a simplified wireless receiver is illustrated. Process 140 has an oscillator operating at a frequency F(OSC) as shown in block 141. The oscillator may be part of a larger radio module, and in particular may be part of the radio transmit chain. The radio may have a transmit/receive controller which may selectively place the oscillator into a receive mode as shown in block 142. When in receive mode, the oscillator may receive a modulator signal at the oscillator's resonator as shown in block 144. The resonator and the nonlinear portion of the oscillator cooperate to mix or demodulate the signal as shown in block 146. An information signal, which may be a mixed or demodulated signal, may be directly extracted from a high impedance port of the nonlinear device as shown in block 148. After functioning as a receiver, the transmit/receive controller may then selectively place the oscillator back into operation in the transmit chain. By using the oscillator as both part of the transmit chain and as the receiver, a highly effective radio may be constructed.

Figure 6:
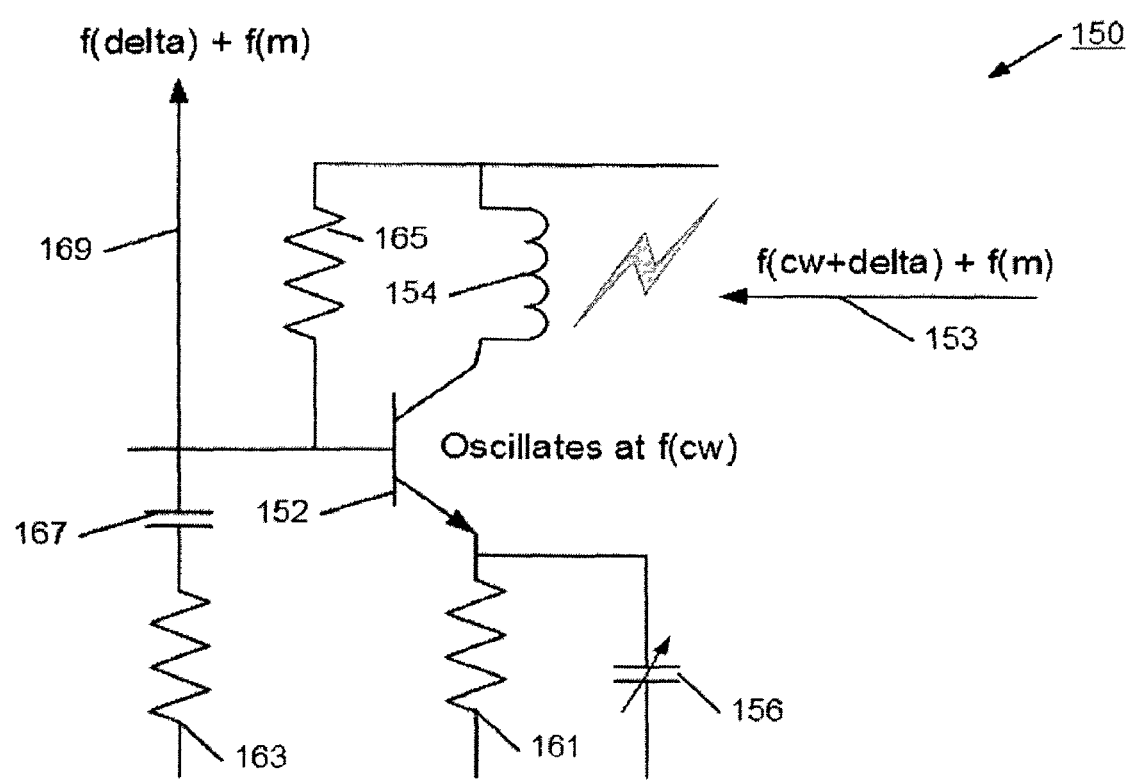
FIG. 6 is a basic circuit diagram of a simplified receiver in accordance with the present invention.

Referring to FIG. 6, a more specific simplified receiver is illustrated. Receiver 150 is shown as a simple oscillator. A simple oscillator has a transistor 152 which acts as a nonlinear element and a resonator element 154 which acts as antenna when the oscillator is function as a receiver. Although transistor 152 is illustrated as a standard transistor, it will be appreciated that other types of transistors, such as field effect transistors, or other transistor types may be used. Also, inductor 154 is shown as an inductor loop, although it will be appreciated that other types of resonators such as micro strips or other inductance elements may be used. The transistor 152 is also coupled to a capacitor 156, which may be variable to assist in adjusting the fundamental frequency of the oscillator. More particularly, the inductor 154, capacitor 156, and the effective resistance of the transistor all cooperate to set and define the oscillation frequency for the oscillator. Resistors 161, 165, and 163 may also be provided. A blocking capacitor 167 is included to block any DC component from reaching other circuit components or ground. The specific design and construction of simple oscillators is well known, so will not be described in detail.

In operation, the oscillator is positioned so that resonator 154 receives a modulated RF signal 153. The modulated RF signal 153 has a carrier frequency that may be at or near the frequency of the oscillator, or more typically, may be set at an offset. Typically, the offset is selected to be about 10 kHz to about 100 kHz. The modulated signal is modulated using a frequency, amplitude, or phase modulation, for example, and thereby carries an information or data signal to the oscillator. The resonator receives the modulated signal, and cooperates with the transistor 152 to generate a mixed or demodulated signal. The mixed or demodulated signal may be extracted from a high impedance port of the transistor, which in this case is a connection to the base of the oscillator 169. In operation, the modulated signal is received at inductor 154, and a demodulated or mixed-signal is extracted directly from the base of transistor 152.

Figure 7:
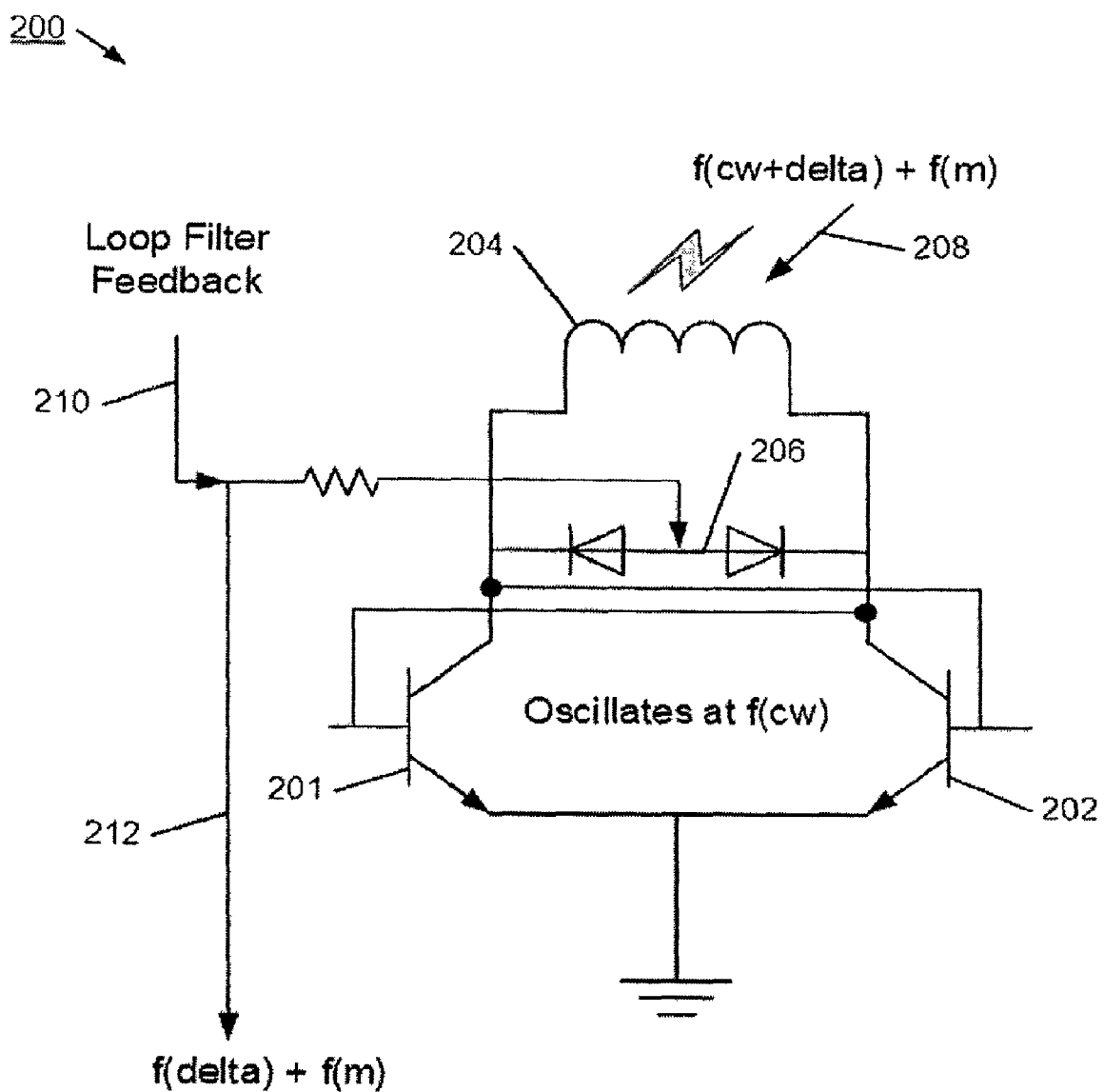
FIG. 7 is a basic circuit diagram of a simplified receiver in accordance with the present invention.

Referring now to FIG. 7, another simplified circuit diagram of a receiver is illustrated. Receiver 200 includes an oscillator constructed to oscillate at a fundamental frequency of F(CW). The oscillator has two collector-coupled transistors 201 and 202. More particularly, the collectors are coupled through a variable capacitance device 206. This variable capacitance device 206 has an input from a phase lock loop circuit, and is in the form of a loop filter feedback signal 210. In operation, the signal provided on the loop feedback signal 210 is used to stabilize the frequency output for the oscillator. The emitters of transistors 201 and 202 are coupled to ground, with each respective base being coupled to the other transistor's collector. A resonator element 204 is coupled across the collectors, and acts as an antenna to receive the modulated signal. The resonator element 204 may be a induction element, such as a strict line or loop antenna, and cooperates with the nonlinear transistors to generate the fundamental frequency. The design and construction of a voltage controlled oscillator is well-known, so will not be described in detail.

The oscillator is positioned so that the resonator 204 may receive a modulated signal 208. The module in signal 208 is received by resonator 204, and cooperates with the nonlinear transistors 201 and 202 to generate a mixed order modulated signal. Although the mixed order modulated signal may be available for extraction at various points in the transistor or resonator circuit, it is most desirably extracted from a high impedance point. A convenience high impedance point is available at the transistor collectors, and a particularly desirable high impedance point is where the loop filter feedback 210 is connected to the variable capacitance device. In this way, the demodulated or mixed-signal may be easily extracted by connecting signal line 212 to the loop filter feedback line 210. However, it will be appreciated that other high impedance points may be available in other specific constructions. Signal line 212 may also be amplified or filtered to further process the mixed or demodulated signal.

In a specific implementation, the tuning varactor 206 is placed in parallel to the coil 204 and is also located between the collectors, with a single (or differential) feed point. The VCO is phase-locked and FM or FSK modulation is imposed on its control line. An ASK modulation scheme is also possible by turning the VCO on and off. An FSK modulation scheme is possible by direct modulation of the VCO control line as is commonly seen and used in FM/FSK radios. In case of a differential VCO, the signal must be collected via a differential amplifier because the CP has a balanced structure. This particular arrangement may involves a small additional circuit design. It may be difficult to collect the product from the collectors of both transistors (there is a small coil between them that "shorts" all low frequencies). Therefore, it was desirable to collect the signal from the varactor feed point, which is the CP output across the loop filter.

Figure 8:
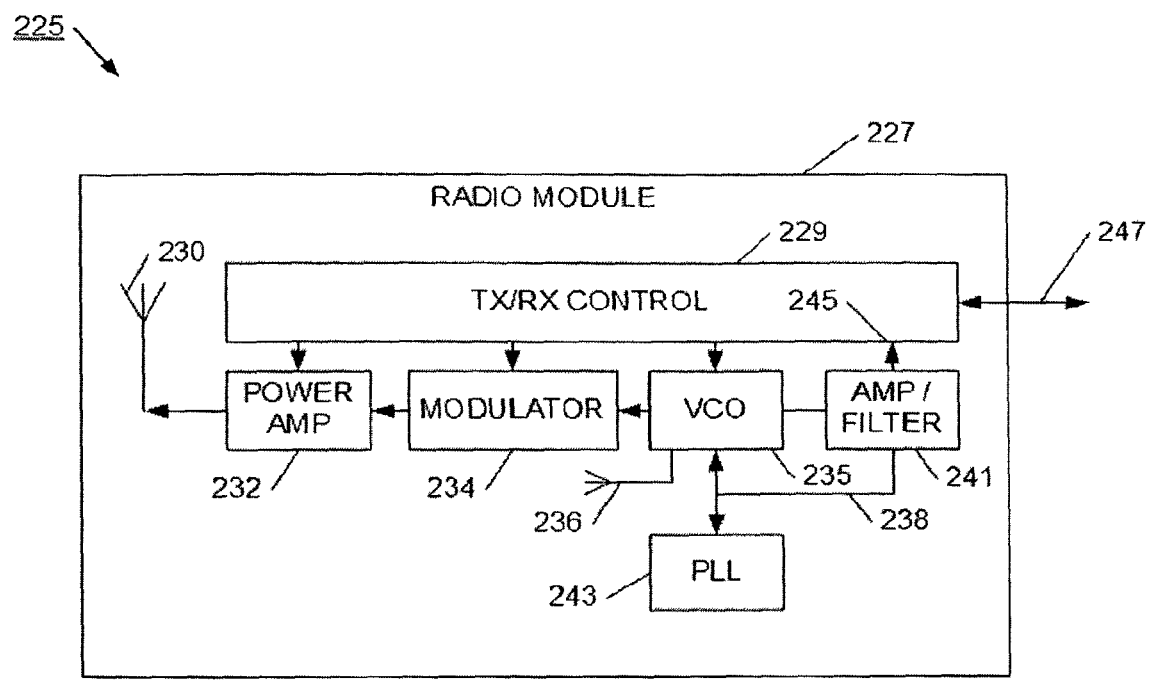
FIG. 8 is a block diagram of a radio module using a simplified receiver in accordance with the present invention.

Referring now to FIG. 8, radio 225 is illustrated. Radio 225 includes a radio module 227 that has a transmit receive controller 229 receiving controls from other parts of the radio on command line 247. The transmit control module provides supervisory control and data processing for various components in the radio. For example, the transmit receiver control may control the power amplifier 232, a modulated 234, and a voltage controlled oscillator 235. The voltage controlled oscillator 235 cooperates with a phase lock loop circuit 243 for improved frequency stability. Together, the VCO 235, PLL 243, modulator 234, power amplifier 232, and antenna 230 cooperate to provide a transmit chain for radio module 227. In this way, the transmit chain elements are activated and used when the radio is instructed to be in a transmit mode.

When the radio module 227 needs to receive information, the transmit/receive control 229 deactivates modulator 234, power amp 232, and antenna 230. The voltage controlled oscillator 235 is placed into a receive mode, such that it is able to receive a modulated signal. The modulated signal is more particularly received by the resonator element of the VCO, and cooperates with the nonlinear element of the VCO to mix or demodulate the received modulated signal. The phase lock loop may be coupled to the VCO with a loop filter control line, and the demodulated or mixed-signal may be extracted as shown by signal line 238. The extracted mixed or demodulated signal may be amplified, filtered, or otherwise processed to further detect information or data on the signal as shown in block 241. The information or data signal 245 is then received in the transmit/receive control module 229, where the information or data may be passed to other portions of the radio.

Advantageously, radio module 227 enables VCO 235 to act as the voltage controlled oscillator for a transmit chain, and then at another time be selected to operate as a receiver for the radio module. In this way, a particularly efficient and effective radio module may be constructed.

Figure 9:
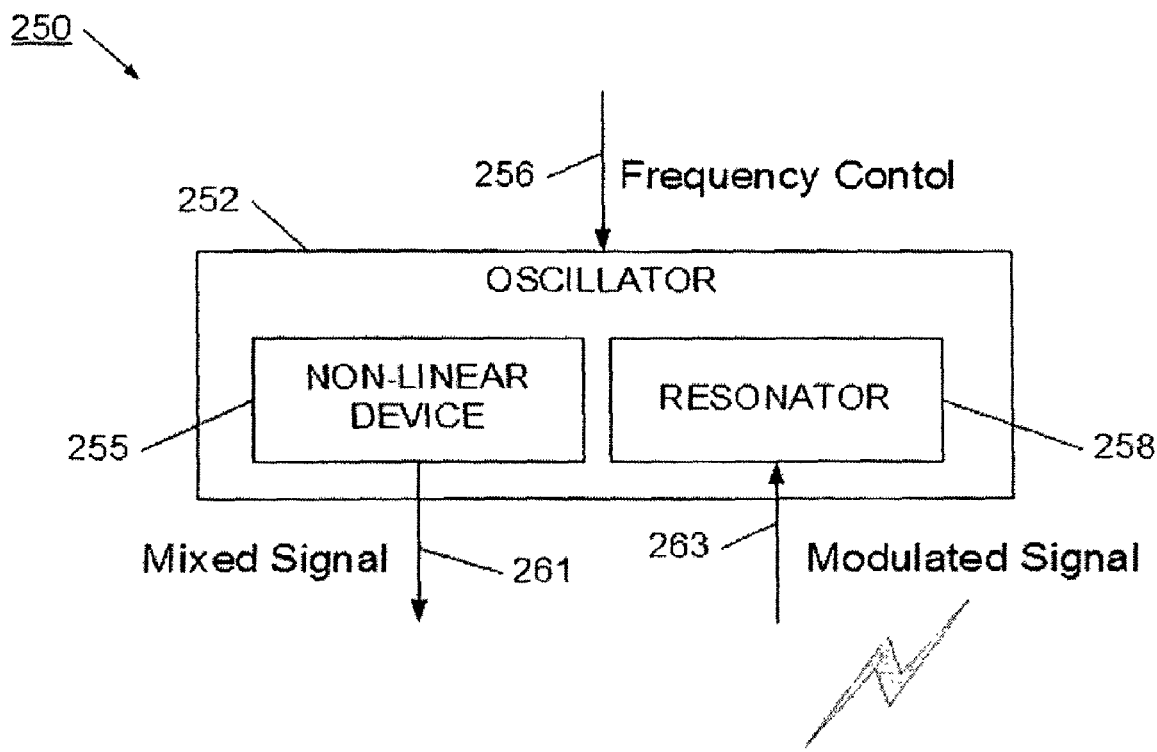
FIG. 9 is a block diagram of a simplified receiver in accordance with the present invention.
Figure 10:
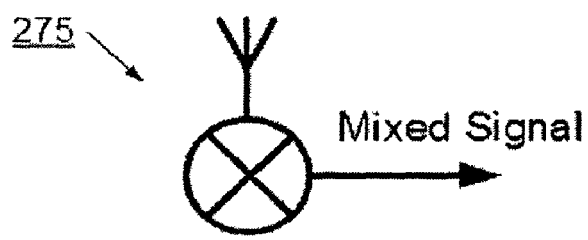
FIG. 10 is an symbol representation a simplified receiver in accordance with the present invention.

Referring now to FIG. 9, a simplified block diagram of a receiver is illustrated. Receiver 250 has an oscillator 252 which has a nonlinear device portion 255 and a resonator portion 258. The oscillator may also have a frequency control 256 for adjusting the resonant frequency of the oscillator. The oscillator receives a modulated signal 263 into its resonator 258, which cooperates with the nonlinear device 255 to produce a mixed-signal 261. The mixing effect may be adjusted by changing the frequency of the oscillator using frequency control 256. For example, by tuning the oscillator to have a frequency at or near the frequency of the carrier signal of the modulated signal 263, a generally demodulated signal may be generated. In a more typical cases, it may be desirable to produce more of the intermediate frequency, so the oscillator may have its frequency adjusted to have a delta frequency from the frequency of the carrier signal. In this way, an oscillator may be simply configured to operate as a receiver that directly outputs a mixed-signal. More particularly, FIG. 10 shows a simplified symbolic illustration, which shows the receiver 275 having an antenna input, a mixing function, and a mixed signal output.

Figure 11:
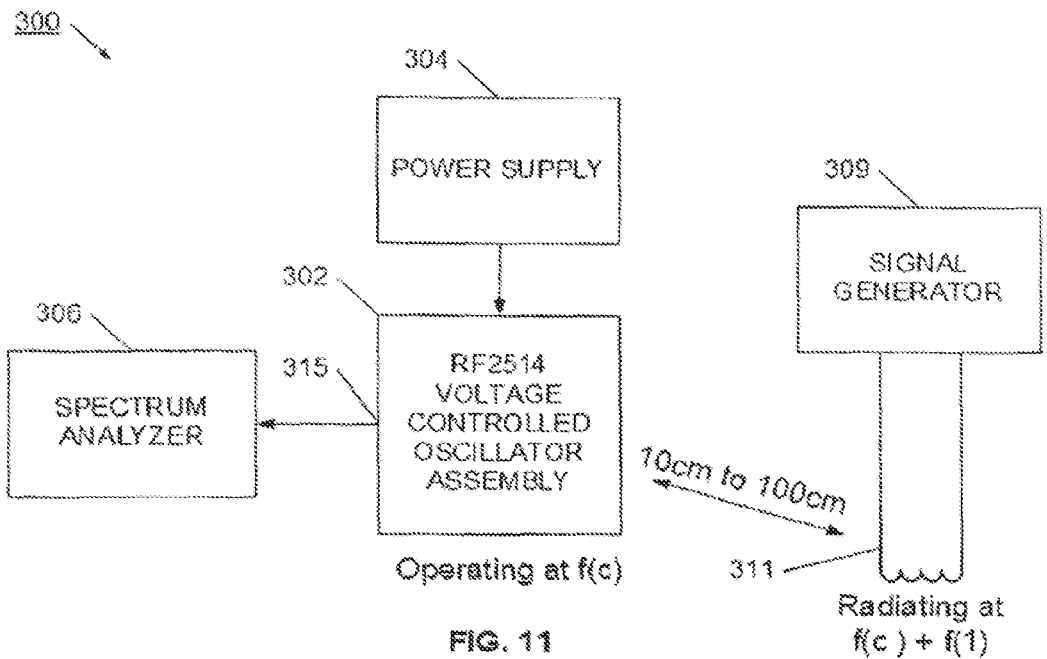
FIG. 11 is a block diagram of a test setup for showing a simplified receiver operating in accordance with the present invention.

Referring now to FIG. 11, a block diagram of an operating wireless receiver is illustrated. Setup 300 has a voltage controlled oscillator assembly 302 powered by a power supply 304. The oscillator is constructed to operate at a center frequency of F(C). The voltage controlled oscillator has a phase lock loop for frequency stability, and has a connection point 315 where a signal may be extracted from a high impedance port of its nonlinear element. In particular, extraction point 315 is on the loop filter control's signal-line. In this arrangement, the VCO assembly 320 is configured to operate as a wireless receiver. To confirm operation as a receiver device, the output port 315 is connected to spectrum analyzer 306 for analyzing the frequency components of the extracted (demodulated) signal.

A transmitter is configured to transmit a signal to the VCO assembly. In particular, a signal generator 309 is constructed to output a sinusoidal wave at a frequency offset from the operating frequency of the oscillator 302. The signal generator is coupled to a loop antenna 311 for radiating the signal. The loop antenna is positioned from about 10 cm to about 100 cm away from the operating voltage controlled oscillator assembly 302. When operating, the signal generator causes an RF signal to be propagated to the VCO assembly.

Figure 12A:
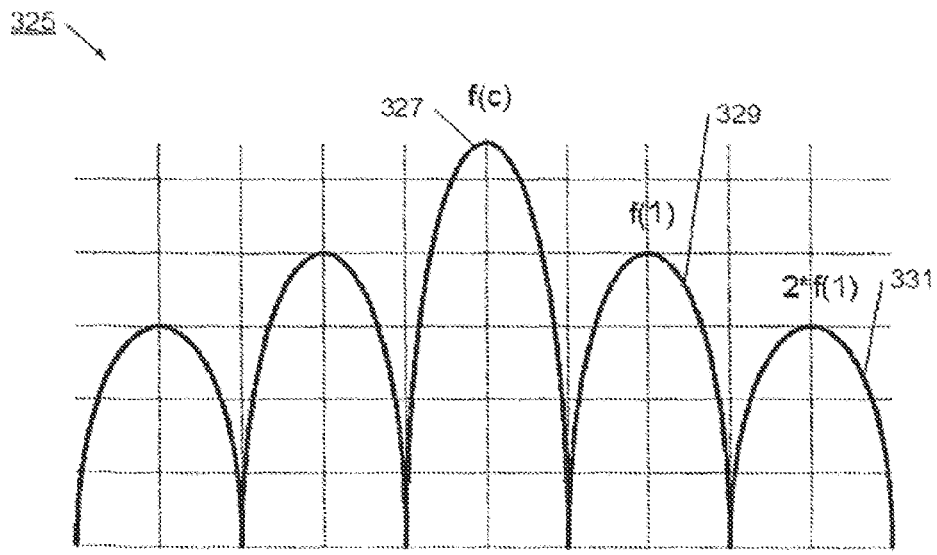
FIG. 12A is representation of an analysis of an output signal from a simplified receiver operating in accordance with the present invention.

FIG. 12A shows a representative display screen of spectrum analyzer 306 when signal generator 309 is activated and modulated. In particular, a substantial peak 327 is found at the frequency at which the voltage controlled oscillator is operating, which is the center frequency for the oscillator. Another significant peak 329 is found offset from the center frequency by a frequency equal to the offset of signal generator 309. Due to the magnitude of peak 329, and since it has been generated as a sideband, it can be confirmed that the voltage controlled oscillator is actively mixing the radiated signal with the locally generated oscillator signal. Also, additional harmonics 331 were created. To further confirm mixing operation, when signal generator 309 was deactivated, frequency peaks 329 and 331 disappeared. Accordingly, the operational test 300 confirmed that the voltage controlled oscillator assembly 302 was acting as an active mixer or demodulator, and not merely as a passive component.

Figure 12B:
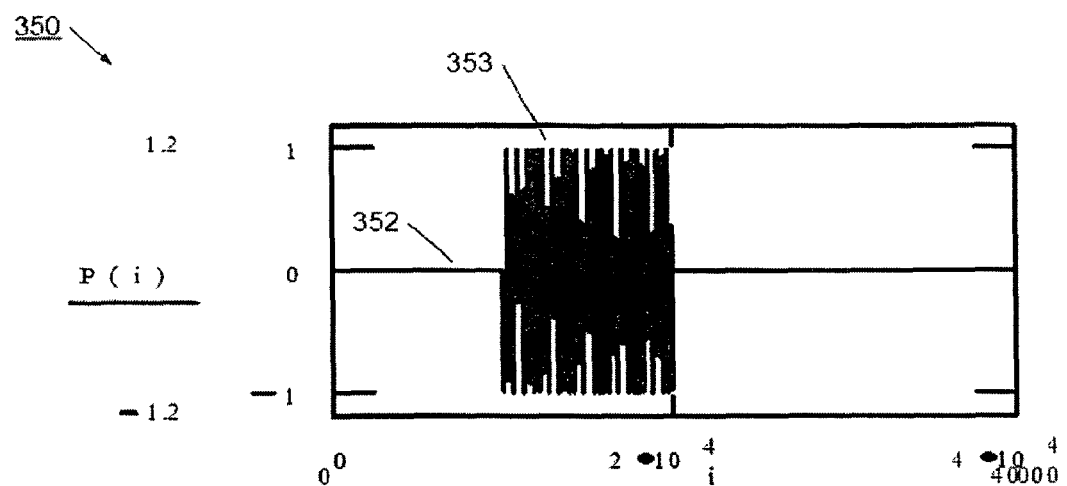
FIG. 12B is representation of an analysis of an output signal from a simplified receiver operating in accordance with the present invention.

FIG. 12B shows a representative oscilloscope display screen when an oscilloscope is connected to output port 315. In this setup, the signal generator was operated at a 30 kHz offset from the VCO frequency F(C) and the signal generator was pulsed to represent an ASK (amplitude shift keying) signal modulation. The signal plot 350 shows that the output port 315 generated an intermediate frequency signal portion 353 according to the duration of the pulse. The signal to noise ratio, as well as the absolute magnitude of the signal, show that the VCO was performing as an active mixing device.

The example illustrate in FIGS. 11 and 12 specifically used an RF2514 VCO as the receiver. The example used the following assumptions:
 a. Pt=0 dBm,
 b. Gt=−20 dB (transmit antenna has −20 dB gain),
 c. Gr (platform antenna has −30 dB gain).
 d. Range is 10 to 100 cm.
 e. Path loss is calculated from standard equations, per $R^{-2}$.
 f. No multipath effects
 g. VCO Gain of 100
 h. Conversion gain of the VCO/mixer of ⅕ (−14 dB)

Figure 13A:
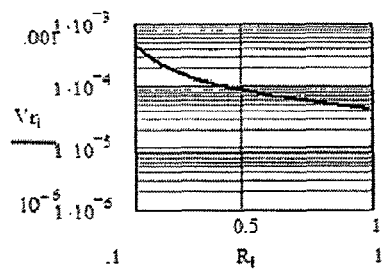
FIG. 13 shows example results for using a simplified receiver in accordance with the present invention.
Figure 13B:
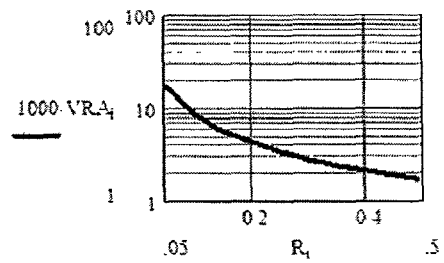
Figure 13C:
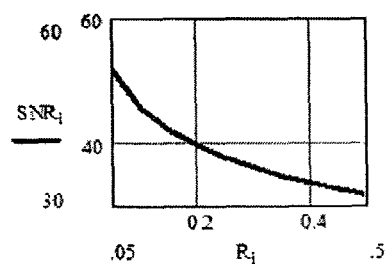

The results, calculated at 1 foot range, produce reception power (at the VCO) of about −83 dBm. The voltage on the resonator (platform resonator impedance is ~3K Ohm), is shown in FIG. 13a. As can be observed, the voltages are rather small. From 1 foot we can observe a 0.1 mV signal. Under the above assumptions, the output baseband signals (mV) is illustrated in FIG. 13b. At a about 30 cm antenna distance (1 foot), the estimated signal is in the 3 mV range at the VCO receiver. The system Signal to Noise Ratio (SNR) performance was simulated as can be seen on in FIG. 13c. It will be appreciated that some of these calculations may vary from actual measured results due to the assumptions underlying the calculations.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A wireless receiver for receiving a modulated signal and outputting a mixed signal, comprising:
   a voltage controlled oscillator constructed to oscillate at a frequency offset from a carrier frequency and positioned to wirelessly receive the modulated signal, the modulated signal carrying an information signal;
   a mixed signal output port on the oscillator constructed to provide a mixed signal indicative of the information signal;
   a phase lock loop (PLL); and
   a phase lock loop control line connecting the voltage controlled oscillator to the PLL wherein the mixed signal output port is on the PLL control line.

2. The receiver according to claim 1, wherein the mixed signal is an intermediate frequency signal.

3. The receiver according to claim 1, wherein the mixed signal is demodulated signal.

4. The receiver according to claim 1, wherein the oscillator further comprises:
   a non-linear element;
   a resonating element connected to the non-linear element; and
   wherein the resonating element and the oscillator cooperate to generate a mixed signal.

5. The receiver according to claim 4, wherein the resonating element is positioned to receive a radiated modulated signal.

6. The receiver according to claim 1, wherein the demodulated signal output port is connected to a high impedance point of the oscillator.

7. The receiver according to claim 1, wherein:
   the oscillator comprises collector-coupled transistors; and
   the mixed signal output port is between the coupled collectors.

8. The receiver according to claim 1, further including an amplifier connected to the mixed signal output port.

9. The receiver according to claim 1, further including a filter connected to the mixed signal output port.

10. A method for demodulating a modulated signal, the modulated signal having a carrier frequency of F Hz and having a modulated information signal, comprising:
    operating an oscillator at a frequency offset from F;
    receiving at the oscillator the modulated signal;
    generating, at the oscillator, a mixed signal output indicative of the information signal;
    wherein the carrier signal for the modulated signal is offset from frequency of the oscillator by a delta frequency in the range of about 10 kHz to about 100 kHz.

11. The method according to claim 10, further including the step of stabilizing the operating frequency of the oscillator using a phase lock loop.

12. The method according to claim 10 U, wherein the receiving step comprises receiving a frequency, phase, or amplitude modulated signal.

13. The method according to claim 10, wherein the oscillator is operating carrier signal for the modulated signal is near frequency F.

14. The method according to claim 10, wherein the receiving step comprises receiving the modulated signal at a resonator element for the oscillator.

15. The method according to claim 10, wherein the generating step includes using a resonator element and a non-linear element of the oscillator.

16. The method according to claim 10, wherein the generating step includes generating an intermediate frequency or demodulated information signal.

17. The method according to claim 10, further including the step of extracting the mixed signal from the oscillator.

18. The method according to claim 17, further including the step amplifying or filtering the extracted mixed signal.

19. The method according to claim 17, further including the step extracting the mixed signal at a high impedance point of the oscillator.

* * * * *